US009628585B2

(12) United States Patent
Gong et al.

(10) Patent No.: US 9,628,585 B2
(45) Date of Patent: Apr. 18, 2017

(54) SYSTEMS AND METHODS FOR CROSS-LAYER SECURE CONNECTION SET UP

(75) Inventors: Michelle X. Gong, Sunnyvale, CA (US); Joshua Boelter, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 134 days.

(21) Appl. No.: 13/997,318

(22) PCT Filed: Dec. 27, 2011

(86) PCT No.: PCT/US2011/067418
§ 371 (c)(1),
(2), (4) Date: Mar. 20, 2014

(87) PCT Pub. No.: WO2013/100912
PCT Pub. Date: Jul. 4, 2013

(65) Prior Publication Data
US 2014/0244723 A1    Aug. 28, 2014

(51) Int. Cl.
*H04L 29/06* (2006.01)
*H04L 9/32* (2006.01)
*H04W 12/02* (2009.01)

(52) U.S. Cl.
CPC .......... *H04L 67/42* (2013.01); *H04L 9/3215* (2013.01); *H04L 63/162* (2013.01); *H04L 63/164* (2013.01); *H04L 63/166* (2013.01); *H04L 63/18* (2013.01); *H04W 12/02* (2013.01)

(58) Field of Classification Search
CPC ..... H04L 63/164; H04L 67/42; H04L 63/166; H04L 9/3215; H04L 63/162; H04L 63/18; H04W 12/02
See application file for complete search history.

(56) References Cited

U.S. PATENT DOCUMENTS

| 6,477,646 | B1 * | 11/2002 | Krishna | ............... G06F 9/3879 712/E9.066 |
| 7,017,042 | B1 * | 3/2006 | Ziai | ............... H04L 9/00 713/161 |
| 7,733,908 | B1 | 6/2010 | Evans | |
| 2002/0019853 | A1 * | 2/2002 | Vange | ................... G06F 9/5027 709/207 |
| 2003/0149874 | A1 * | 8/2003 | Balfanz | ............... H04L 63/0492 713/168 |

(Continued)

FOREIGN PATENT DOCUMENTS

EP    0978977    2/2000

OTHER PUBLICATIONS

International Search Report from related application PCT/2011/067418 filed Dec. 27, 2011.

*Primary Examiner* — Wing F Chan
*Assistant Examiner* — Billy H Ng
(74) *Attorney, Agent, or Firm* — Grossman, Tucker, Perreault & Pfleger, PLLC (57) ABSTRACT

Described herein are systems and methods for establishing a secure communications channel between electronic devices. In some embodiments, the secure data channel includes a secure layer 2 and a secure layer 3 connection between a client and a server. The secure layer 2 and secure layer 3 connections may be established using information transferred out of band between the client and server.

27 Claims, 6 Drawing Sheets (56) References Cited

U.S. PATENT DOCUMENTS

| | | | |
|---|---|---|---|
| 2005/0160273 A1* | 7/2005 | Oishi | H04L 63/062 713/180 |
| 2005/0266826 A1* | 12/2005 | Vlad | H04L 63/0492 455/410 |
| 2006/0053486 A1 | 3/2006 | Wesinger, Jr. et al. | |
| 2006/0129733 A1 | 6/2006 | Sobelman | |
| 2006/0251256 A1* | 11/2006 | Asokan | H04L 63/065 380/270 |
| 2007/0079113 A1* | 4/2007 | Kulkarni | H04L 63/0492 713/150 |
| 2010/0082784 A1 | 4/2010 | Rosenblatt et al. | |
| 2012/0130902 A1* | 5/2012 | Dingler | G06F 21/35 705/71 |
| 2012/0252405 A1* | 10/2012 | Lortz | G06F 8/60 455/410 |
| 2012/0290689 A1* | 11/2012 | Beguelin | H04L 67/125 709/220 |

\* cited by examiner

SYSTEMS AND METHODS FOR CROSS-LAYER SECURE CONNECTION SET UP

FIELD

The present disclosure generally relates to systems and methods for establishing a secure communications channel between electronic devices, as well as data sharing between electronic devices.

BACKGROUND

Recently, interest has grown in sharing data between electronic devices such as cell phones, smart phones, televisions, and the like. Because of this trend, solutions have been developed to permit the transfer of data between such devices. Such solutions often require two or more devices to be connected via a physical connection (e.g., a universal serial bus (USB) connection, an ethernet connection, and the like) or through a wireless connection (e.g., a wireless network complying with the 802.11 standard). In addition, solutions exist that permit data transfers from one device to another via a service, such as electronic mail, social networks, and the like.

While physical connections such as USB and ethernet can allow data to be transferred between devices, such connections may not be available on many devices. For example, many cellular phones do not include an interface for such connections. Moreover, conducting a data transfer with a physical connection requires an appropriate connection cable, which a device user may not have and which may be inconvenient to carry from place to place.

The transfer of data wirelessly between two devices is often more convenient than a physical connection. However, establishing a wireless network connection between devices can be complicated and/or unintuitive, leading to a frustrating or otherwise undesirable user experience. In addition, the components of such a wireless connection may be unsecure, and therefore subject to compromise by unauthorized third parties.

Although service-based mechanisms can be used to transfer data, such mechanisms are often slow and/or undesirable. Moreover, such services often require all parties to a data transfer to have access to the same service. If one of the parties lacks such access, it may not be possible to perform a transfer with that party.

BRIEF DESCRIPTION OF THE DRAWINGS

Features and advantages of embodiments of the claimed subject matter will become apparent from the following detailed description and the drawings, wherein like numerals depict like parts, and in which:

Although the following detailed description will proceed with reference being made to illustrative embodiments, many alternatives, modifications, and variations thereof will be apparent to those skilled in the art.

DETAILED DESCRIPTION

The terms "data" and resources" are used interchangeably herein to refer information that may be resident on a device and/or services that a device may be capable of performing. Accordingly, the terms "data" and "resources" encompass information stored in memory within a device (such as but not limited to files, programs, and the like), as well as services that a device may perform (such as but not limited to printing services, display services, transmission services, and the like).

The terms "layer 2" and "layer 3" are used herein to reference the data link layer and the network layer, respectively, of the open systems interconnection (OSI) model. Similarly, the terms, "layer 2 connection" and "data link layer connection" are interchangeably used herein to reference a connection in the data link layer of the OSI model. Likewise, the terms "layer 3 connection" and "network layer connection" are interchangeably used herein to reference a connection in the network layer of the OSI model.

The phrase "out of band" (OOB) when used in connection with a data transfer means a data transfer that occurs between at least two devices using a medium other than the network connection between such devices that will be used for data communication in connection with a secure communication channel as described herein. Such a medium is hereinafter referred to as an "out of band transfer medium" or "OOB transfer medium". Information contained in an OOB transfer medium and transferred OOB between devices is referred to herein as "out of band information," or "OOB information."

Non-limiting examples of OOB transfer media that may be used in accordance with the present disclosure include various types of visual, auditory, and/or electronic media, such as but not limited to near field communication (NFC), barcodes, infrared red (IR) communication, a user input, sound, and combinations thereof. As examples of suitable barcodes that may be used as OOB transfer media in accordance with the present disclosure, non-limiting mention is made of linear barcodes and matrix barcodes, including without limitation aztec code, small aztec code, data matrix code, dot code, quick response (QR) code, other matrix barcode, and combinations thereof. In some embodiments, the systems and methods of the present disclosure use at least one of NFC, QR code, or a combination thereof as an OOB transfer media to facilitate the transfer of OOB information between at least two devices.

The present disclosure generally relates to systems and methods for establishing a secure communications channel ("SCC") between multiple devices over a wireless network. In some non-limiting embodiments, the systems and methods establish an SCC through the use of a unified pairing protocol ("UPP") that establishes a secure data link layer (layer 2) and a secure network layer (layer 3) connection between multiple devices on a wireless network. In some instances, the UPP utilizes OOB information to facilitate the establishment of the secure layer 2 and secure layer 3 connections.

Figure 1A:
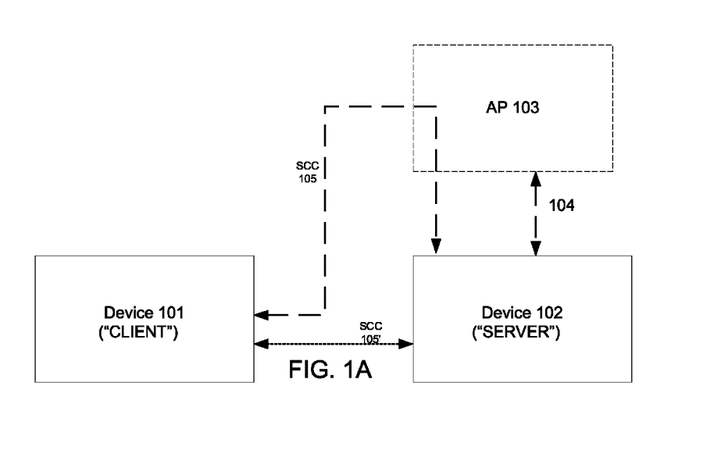
FIG. 1A is a block diagram of an exemplary system architecture in accordance with non-limiting embodiments of the present disclosure.

In this regard, reference is made to FIG. 1A, which illustrates an exemplary system architecture consistent with non-limiting embodiments of the present disclosure. As shown, system architecture 100 includes devices 101 and 102. In this non-limiting example, device 102 may be connected to infrastructure access point (AP) 103, e.g., through (wired/wireless) connection 104. In such instances, the systems and methods of the present disclosure may establish an SCC between device 101 and device 102 through infrastructure AP 103. Such an SCC is labeled in FIG. 1A as SCC 105.

As further shown in FIG. 1A, device 102 may be capable of establishing a wireless network without the use of infrastructure AP 103. For example, device 102 may be capable of establishing a wireless peer to peer ("P2P) network (also known as a personal area network, or "PAN"), such as but not limited to an ad-hoc Wi-Fi network, a Wi-Fi network using a soft access point, a BLUETOOTH® network, and the like. In such instances, the systems and methods of the present disclosure can enable the establishment of an SCC between device 101 and device 102 through a P2P network established by device 102. Such an SCC is labeled in FIG. 1A as SCC 105', and may be considered a direct connection between devices 101 and 102.

For the sake of clarity, FIG. 1A depicts system architecture 100 as including only two devices. While such an illustration is useful for explaining various aspects of the present disclosure, it should be understood the systems and methods described herein may be used to establish an SCC between any number of devices. Indeed, the systems and methods of the present disclosure can enable the creation of an SCC between a plurality (e.g., 3, 4, 5, 6, 7, 8, and so on) of different devices, thereby facilitating secure data sharing between all or a subset of such devices. It should therefore be understood that FIG. 1A is used herein as a non-limiting point of reference for describing the systems and methods of the present disclosure.

Also for the sake of clarity, devices 101 and 102 are designated in FIG. 1A as a "client," and a "server," respectively. In the context of the present disclosure, the terms "client" and "server" are used to distinguish between a device that conveys OOB information ("server") and a device that receives OOB information ("client"). It should be understood however, that any or all of the devices used in accordance with the present disclosure may have the capability of both conveying OOB information and receiving OOB information. Accordingly, the designation herein of one device as a server and another device as a client may depend on the particular use case under consideration.

With this in mind, FIG. 1A is labeled in accordance with a non-limiting use case in which device 102 facilitates the establishment of SCC 105, 105' by conveying OOB information to device 101. In such a use case, device 102 may be considered a server, and device 101 may be considered a client. As noted above, however, devices 101 and 102 may each have the capability to convey OOB information and receive OOB Information. Thus, use cases in which device 101 conveys OOB information to device 102 are possible. In such cases, device 101 would be a server, and device 102 would be a client.

Devices 101 and 102 (i.e., client and server, the devices on either side of an SCC) may each be one or more electronic devices that are capable of communicating through a wireless network (such as those previously described), as well as sending and/or receiving OOB information. As non-limiting examples of such devices, mention is made of automated teller machines, automobiles, copiers, cell phones, desktop computers, displays (e.g., televisions, monitors, projections screens, digital signage, and the like), electronic readers, fax machines, game consoles, kiosks, netbook computers, notebook computers, internet devices, payment terminals, personal digital assistants, media players and/or recorders, printers, public computer terminals, set-top boxes, smart phones, tablet personal computers, ultra-mobile personal computers, wired telephones, and combinations thereof.

In non-limiting preferred embodiments the client and server in the present disclosure are capable of both sending and receiving OOB information. However, embodiments wherein either or both of the client and server are capable of only conveying or receiving OOB information are envisioned. In such instances, devices having the capability to convey OOB information may be used as a server, and devices having the capability to receive OOB information may be used as a client.

Devices 101 and 102 may each include a device platform correlating to one or more of the aforementioned devices types. Thus, device 101 and/or device 102 may include an automated teller machine platform, an automobile platform, a copier platform, a cell phone platform, a desktop computer platform, a display platform, an electronic reader platform, a fax machine platform, a game console platform, a kiosk platform, a netbook computer platform, a notebook computer platform, an internet device platform, a payment terminal platform, a personal digital assistant platform, a media player and/or recorder platform, a printer platform, a public computer terminal platform, a set-top box platform, a smart phone platform, a tablet personal computer platform, an ultra-mobile personal computer platform, a wired telephone platform, and combinations thereof.

Figure 1B:
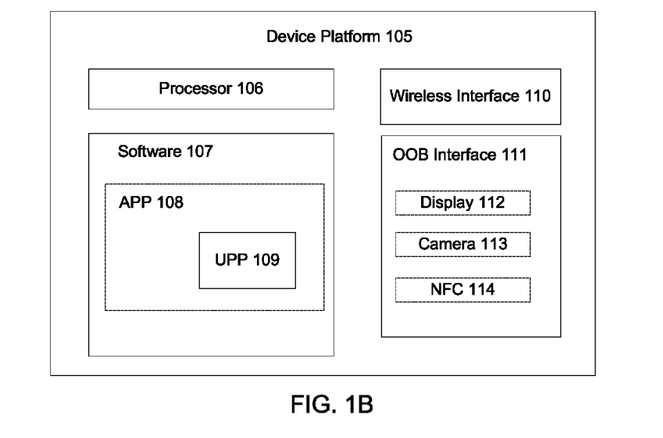
FIG. 1B is a block diagram of an exemplary device platform in accordance with non-limiting embodiments of the present disclosure.

As a non-limiting illustration of a device platform that may be used in client and server devices consistent with the present disclosure, reference is made to FIG. 1B. For the sake of clarity, it is noted that the exemplary device platform shown in FIG. 1B may be utilized in both device 101 and device 102 in FIG. 1B. Thus, it may be understood that devices on either side of an SSC in accordance with the present disclosure may be of the same or different device platform. Thus, for example, an SSC may be established between a smartphone and a smartphone, a cell phone and a smartphone, a smartphone and a printer, a media player and a display, and so on.

As shown, device platform 105 includes processor 106. Device platform 106 further includes a memory (not shown) having software 107 stored thereon, which may be executed by processor 106. Software 107 may include, for example, an operating system and associated libraries necessary (not shown) for executing the functions of a device of which device platform 105 is a part (e.g., a cell phone, a smart phone, a printer, etc.). In addition, software 107 may include application (APP) 108 and unified pairing protocol (UPP) 109, the function of which will later be described in detail. It is noted that UPP 109 may be provisioned within device platform 105 as instructions on a computer readable medium, which when executed by a processor cause the processor to perform data sharing operations and/or unified pairing protocol operations consistent with the present disclosure.

Device platform 105 may also include at least one wireless network interface, such as wireless interface 110. In some embodiments, wireless interface 110 is an interface that is capable of communicating through and/or establishing a wireless network, such as but not limited to the wireless networks described above. As non-limiting examples of suitable wireless network interfaces that may be used in accordance with the present disclosure, mention is made of radio frequency (RF) transceivers, cellular network transceivers, wireless local area network transceivers, wireless personal area network transceivers, ultra-wideband network transceivers, combinations thereof, and the like. In some embodiments, wireless interface 110 is capable of bidirectional communication through wireless networks complying with the institute of electrical and electronics engineers (IEEE) 802.11 standard, including Wi-Fi networks using an infrastructure access point, ad-hoc Wi-Fi networks, BLUETOOTH® networks, Wi-Fi networks established using a soft access point, and combinations thereof.

Device platform 105 may further include at least one out of band (OOB) interface, such as OOB interface 111. Generally OOB interface 111 is an interface that is capable of sending and/or receiving information through at least one OOB transfer medium. In some instances therefore, OOB interface 111 may be understood as a combination of hardware and software resources that can facilitate the encoding, conveyance, reception, and/or decoding of an OOB medium. Accordingly, OOB interface 111 may include, for example, at least one display, camera, near field communications (NFC) controller, speaker, microphone, and combinations thereof, either alone or in combination with suitable supporting software. Such components are illustrated as display 112, camera 113, and NFC 114 in FIG. 1B, with hashing used to indicate their optional provision within device platform 105. Of course, such components are exemplary only, and other components may be used in or as OOB interface 111. The use of the exemplary OOB interfaces shown in FIG. 1B to exchange information OOB from a server to a client will be described later in connection with exemplary methods of establishing an SCC consistent with non-limiting embodiments of the present disclosure.

One aspect of the present disclosure relates to methods for establishing an SCC between multiple devices over a wireless network. In this regard, reference is made to FIG. 2, which depicts an exemplary flow diagram of a method consistent with non-limiting embodiments of the present disclosure. For simplicity, description of the methods of the present disclosure will proceed in the context of a non-limiting use case in which an SSC is to be established between a first device (client) and a second device (server), such as shown in FIG. 1A. As noted above, however, the present disclosure encompasses embodiments wherein an SSC is established between more than two devices. It should therefore be understood that the following description applies to such embodiments, even though it focuses on the establishment of an SSC between a single client and a single server.

Figure 2:
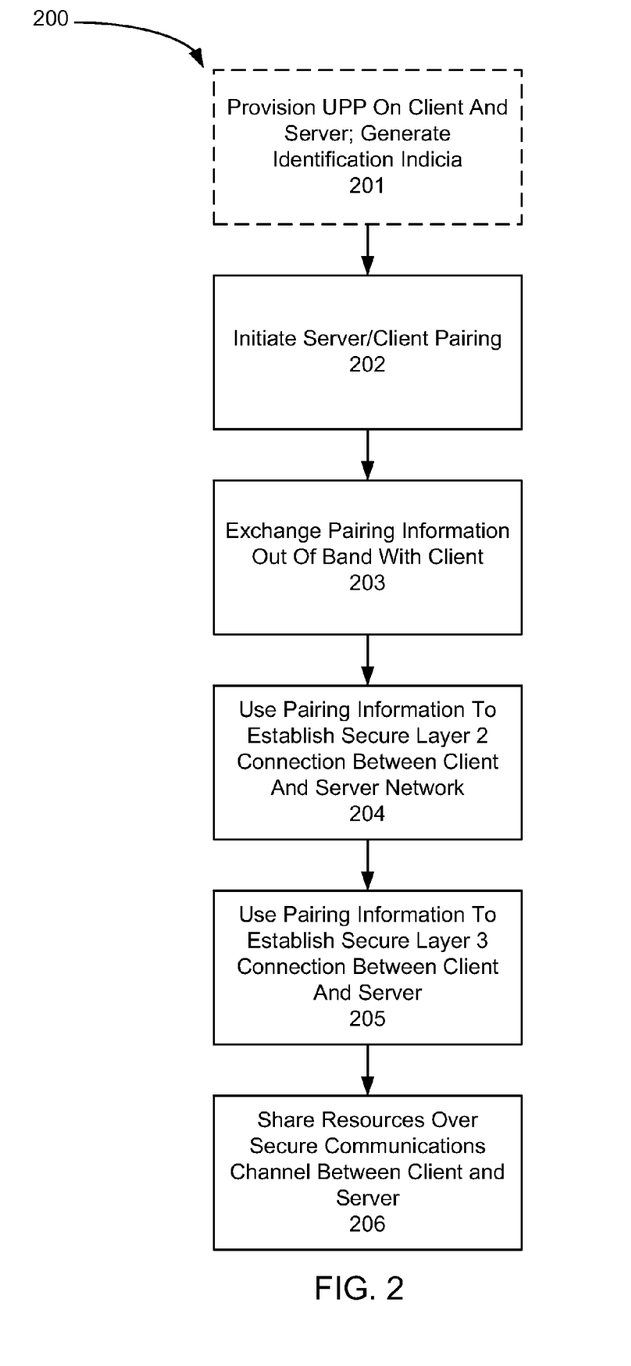
FIG. 2 is a flow diagram of an exemplary method of establishing a secure communications channel between multiple electronic devices, in accordance with non-limiting embodiments of the present disclosure.

As shown, method 200 begins at block 201, wherein a unified pairing protocol (UPP) is provisioned on a first device (client) and a second device (server) that will be present on either side of a proposed SSC. As noted above, a UPP may be understood as instructions stored on a computer readable medium, which when executed by a processor cause the processor to execute pairing protocol operations consistent with the present disclosure. Accordingly, the UPP described herein may be provisioned on client and server devices as part of an operating system, as an independent application, and/or as part of an application (APP) that facilitates communication among multiple devices by leveraging the UPP and, in some instances, by providing an appropriate graphical user interface.

When a UPP in accordance with the present disclosure is installed and/or first executed on a device, it can generate identifying indicia that can serve to uniquely identify that device to other devices. Such identifying indicia may include for example, one or more keys (such as but not limited to a public key, a private key, and a public/private key pair), one or more certificates, one or more random numbers, and the like. Non-limiting examples of certificates that may be used as or in association with identifying indicia include certificates that comply with the X.509 protocol set by the International Telecommunication Union Standardization Sector, and certificates that do not comply with such a standard. Once generated, such identifying indicia may be stored in memory and later used, for example, to identify a client to a server, and vice versa.

It should be understood that block 201 in FIG. 2 is only necessary in instances wherein either or both of the client and server do not already have a UPP provisioned thereon. In some instances, both a client and a server may already have a UPP at the time an SCC will be established. In such instances, block 201 may be considered optional, and method 200 may proceed starting from block 202.

In any case, once a UPP is provisioned on both the client and the server and has generated identifying indicia, the method may proceed to block 202, wherein pairing of the client and server may be initiated. Once client/server pairing is initiated, the method may proceed to block 203, wherein OOB Information containing pairing information may be exchanged between the server and the client using at least one OOB transfer medium. Once the OOB information is exchanged, it may be used to establish a secure layer 2 connection between the client and a server network, as shown in block 204 of FIG. 2. As used herein, the term "server network" refers to a network to which the server is connected (such as but not limited to a wireless network using an infrastructure access point), or which the server has created (such as but not limited to an ad-hoc Wi-Fi network and/or a Wi-Fi Network established by the server using a software access point).

The method may then proceed to block 205, wherein the pairing information may be used to establish a secure layer 3 connection between the client and the server. Once the secure layer 2 and layer 3 connections are in place, an SCC is established between the client and the server, and data may be exchanged between the devices, as shown in block 206 of FIG. 2.

Figure 3A:
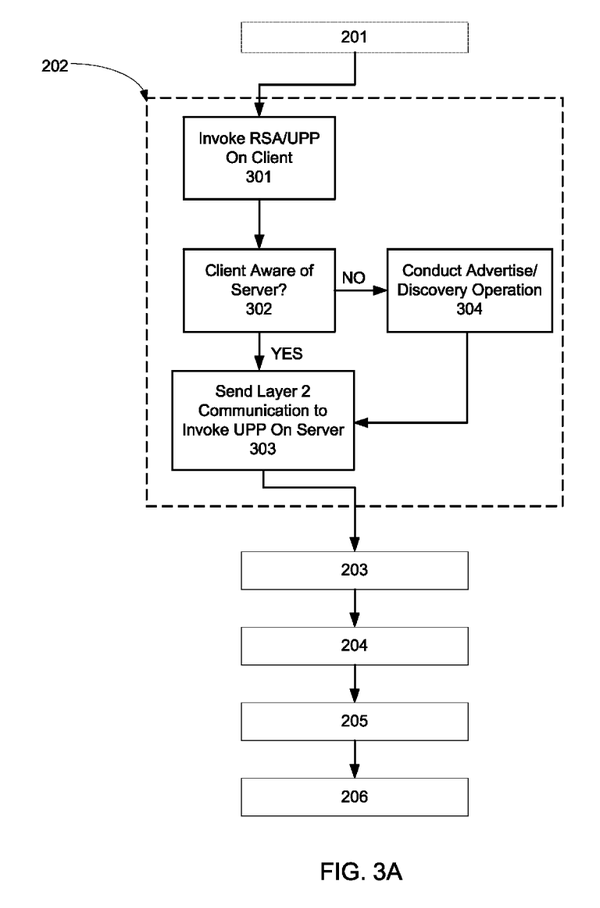
FIG. 3A is a flow diagram illustrating a method of initiating client/server pairing in accordance with non-limiting embodiments of the present disclosure.

FIG. 3A is a flow diagram illustrating a method of initiating client/server pairing in accordance with non-limiting embodiments of the present disclosure. As shown, this diagram provides further details with respect to operations that may be performed in block 202 of FIG. 2.

Once a UPP has been provisioned on a client and a server (block 201), pairing of the client and server may be initiated by invoking the UPP on the client (block 301). For example, a UPP may be invoked on the client by executing the UPP as an application on the client. Alternatively or additionally, the UPP may be invoked by executing an application (APP) that leverages the UPP to facilitate data communications between the client and the server.

Once the UPP is invoked on the client, the process may proceed to block 302, wherein a determination may be made as to whether the client is aware of a server to which it can connect. For example, at the time an SCC is to be established, the client may be connected (perhaps insecurely) to or otherwise aware (e.g. through layer 2 discovery) of one or more devices that may act as servers in the context of a data sharing operation consistent with the present disclosure. Additionally or alternatively, the client may store information regarding servers and/or networks to which it has connected in the past, in which case the client may become aware of such servers and/or networks when it is brought into proximity with them.

If the client is unaware of a server that it can connect to, the process may proceed to block 304, in which an advertise/discovery operation may be performed. Such advertise/discovery operation may be, for example, a layer 2 service discovery operation that allows the client to identify services (e.g., servers, access points, etc.) that are in proximity to it. In some embodiments, such an operation may include placing a server and/or an access point in an advertise mode, which may allow the server/access point to be detected by the client.

Once the client is aware of a server, it may notify a user of the client ("client user") of the server's existence. In this regard, the client may include a graphical user interface (client GUI) that can be used to graphically illustrate available servers to a user. In some embodiments the client GUI is executed in association with an application, and a client user may select a particular server for connection through a client GUI, after which the process may proceed to block 303. Alternatively, the process may proceed to step 303 once the client becomes aware of the presence of a server, without input from a client user.

In any case, in block 303 the client can initiate communication with a server. For example, in instances where a personal area network is to be established, such as a BLUETOOTH® network or an ad-hoc or direct Wi-Fi (soft access point) link is to be established with the server, the client may send one or more layer 2 packets directly to the server. Alternatively or additionally, if the server is connected to an infrastructure access point, the client may establish a layer 2 connection with the infrastructure access point, which can then route communications between the client and the server.

Once layer 2 communication has been initiated between the client and server, the client can further communicate with the server. For example, the client may transmit packets containing the client's identifying indicia (generated in block 201), a request to execute a unified pairing process between the client and the server, as well as information regarding mechanisms that the client supports for the receipt of OOB information from the server (e.g., NFC, barcode, etc., as previously described). The process may then proceed to block 203 of FIG. 2, which will be described in detail below with reference to FIG. 3B.

Figure 3B:
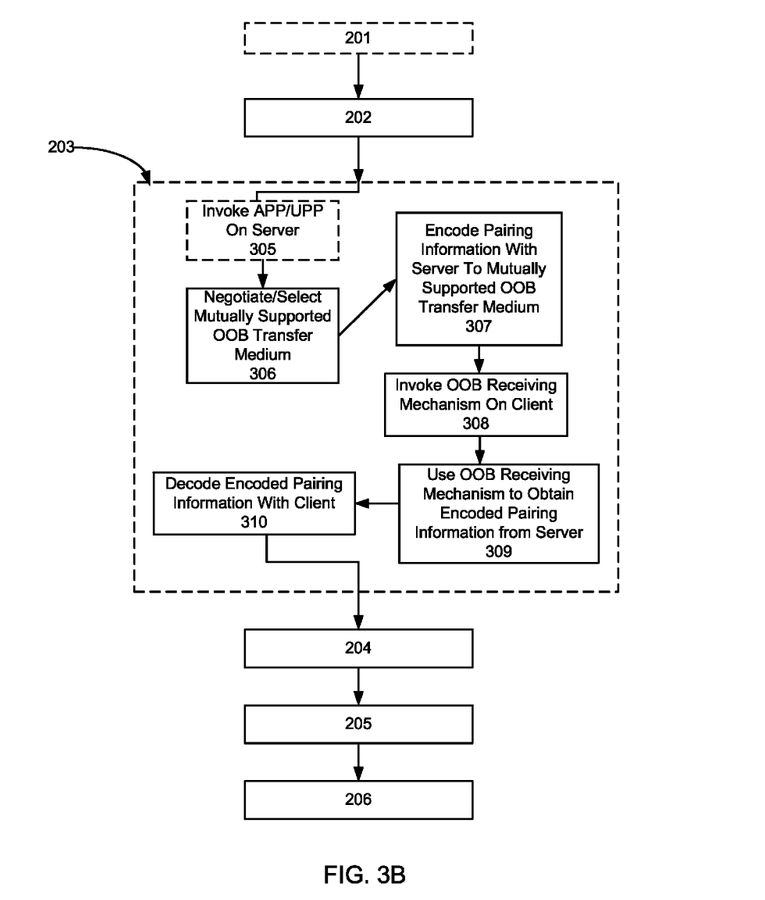
FIG. 3B is a flow diagram of a non-limiting method of exchanging pairing information out of band with a client, in accordance with non-limiting embodiments of the present disclosure.

FIG. 3B is a flow diagram of an exemplary method of exchanging pairing information out of band between a client and server, in accordance with non-limiting embodiments of the present disclosure. It is noted that FIG. 3B provides further details with respect to operations that may be performed in block 203 of FIG. 2.

Once the server receives a request to execute a unified pairing process from the client, it may execute a UPP within its own device platform (block 305). Like the UPP on the client, the UPP on the server may be provisioned as part of an operating system, as an independent application, or as a resource leveraged by a server side application (APP). Accordingly, the server side UPP may be initiated by executing the UPP as an application on the server, and/or by executing a server side APP that leverages the UPP to facilitate data communication between multiple devices. While the present disclosure envisions circumstances in which a server side APP is the same as client side APP, such a configuration may not be required so long as the client and server side APPs are capable of executing a UPP in accordance with the present disclosure.

In some instances, receipt by the server of the client information discussed above may automatically trigger the execution of a server side UPP. Accordingly, in non-limiting preferred embodiments receipt of packets containing client information causes the server to invoke its UPP without input from a server user. In other non-limiting embodiments, receipt of such packets may cause the server to prompt a server user of the client's request to initiate a unified pairing process consistent with the present disclosure. In such instances, the process may be allowed to proceed once the server user positively responds to the client's request to connect.

Block 305 is illustrated in FIG. 3B with hashing to account for instances wherein a server side UPP are already being executed at the time a client initiates communication with the server. In such instances, the process may proceed as described above with respect to block 305, except that execution of the server side UPP need not be initiated by a server user or client communications.

Once the server side UPP is invoked, the process may proceed to block 306, wherein an OOB transfer medium that is mutually supported by the client and the server may be negotiated. For example, the server may analyze communications from the client sent pursuant to block 202 for information about mechanisms the client supports for the receipt of OOB information. Alternatively or additionally, the server may query the client to provide information regarding its supported mechanisms for receiving OOB information.

Once the server sufficiently identifies OOB mechanisms supported by the client, the server may select an OOB transfer medium that it supports, and which is compatible with the mechanisms for receiving OOB information supported by the client. Thus, for example, if the client and the server both support the transfer of OOB information by NFC (e.g., both devices include an NFC controller), the server may select NFC as a mutually supported OOB transfer medium. In other non-limiting embodiments, the client may be capable of reading and decoding barcodes, and the server may be capable of encoding OOB information into barcodes and presenting such barcodes on a display. In such instances, the server may select one or more barcodes as a mutually supported OOB transfer medium. And in still further non-limiting embodiments the client may be capable of receiving and decoding audio via a microphone, and the server may be capable of encoding OOB information into sound and playing such sound through a speaker. In such instances, the server may select one or more audio signals as a mutually supported OOB transfer medium.

Once a mutually supported OOB transfer medium has been selected, the process may proceed to block 307. Pursuant to this block, the server may encode OOB information into the mutually supported OOB transfer medium selected pursuant to block 306. The OOB information may include pairing information that the client may use to establish at least one of a secure layer 2 connection (hereafter, "server network information") and a secure layer 3 connection (hereafter, "server datalink information") with the server over a wireless network. In addition, the OOB information may include at least one passcode that is unique to each client that wishes to connect to the server.

As non-limiting examples of server network information that may be used in accordance with the present disclosure, mention is made of the service set identifier ("SSID"), security type (e.g., wired equivalent privacy (WEP); Wi-Fi protected access (WPA); Wi-Fi protected access 2 (WPA2); etc.), and network password associated with the network that the server is on. If the server is not on a network, it may invoke appropriate hardware and software resources to create a wireless network (e.g., a P2P wireless network as discussed above), and encode information relevant to such network as server network information. In other words, the server may initiate an ad-hoc and/or direct wireless link with the client by establishing a P2P network as described above, and encode server network information into a mutually supported OOB transfer medium that is sufficient to allow the client to establish a secure layer 2 connection with that network.

As non-limiting examples of server datalink information that may be used in accordance with the present disclosure, mention is made of the server's internet protocol (IP) address, host name, service identification, operating system identification, and port number. Datalink information may also include other information, such as but not limited to the server's identifying indicia (generated by a UPP as described above in connection with block 201), one or more random passcodes, and/or information that may be used to establish a data communication session with an application executed on the server (such as but not limited to a personal identification number, a key, and the like).

The passcode generated by the server and encoded in the mutually supported OOB transfer medium may be unique to each client that wishes to connect to a server. Non-limiting examples of suitable passcodes include alphanumeric phrases, random numbers, random digital sequences, and the like. As will be discussed below, such passcode may be later used as a shared secret between the client and the server to establish a secure layer 3 connection. Moreover, it should be understood that because the passcode may be transferred between a server and a client using an OOB transfer medium, no user interaction may be required to input the passcode into one or more of the client/server. As a result, the passcode may be significantly longer than passcodes that might otherwise be suitable when human input of such passcode is required. Accordingly, the present disclosure envisions passcodes that range from 1 to 5,000 characters or more. Indeed, passcodes containing about 10, 20, 30, 40, 50, 75, 100, 250, 500, 1000, 2500, 5000 or more characters (including all individual points between such endpoints and ranges between such endpoints) are envisioned.

In any case, the encoded pairing information may include robust error correction, such as Reed Solomon codes L, M, Q, and H. Such codes may be understood as indicating that about 7, about 15, about 25 and about 30% respectively, of code words associated with the encoded pairing information may be restored.

In some embodiments of the present disclosure, the client and the server both support NFC as an OOB transfer medium. In such instances, the client may inform the server of its NFC support (per block 202), and the server may select NFC as a mutually supported OOB transfer medium. The server may then encode pairing information such as previously described into one or more signals suitable for transmission by NFC.

In other non-limiting embodiments, the client and the server both support one or more barcodes as an OOB transfer medium. In such embodiments, the client may inform the server of its barcode support (per block 202), and the server may select an appropriate barcode as a mutually supported OOB transfer medium. The server may then encode pairing information such as previously described into a mutually supported barcode format, such as but not limited to QR code, which may then be presented on the display of the server.

In other non-limiting embodiments, the client and the server both support audio as an OOB transfer medium. In such embodiments, the client may inform the server of its audio support (per block 202), and the server may select an appropriate audio signal as a mutually supported OOB transfer medium. The server may then encode pairing information such as previously described into a mutually supported audio signal format, which may then be played through one or more speakers on the server.

In some embodiments, the server may encode OOB information into the mutually supported OOB transfer medium in a manner that controls the size of the encoded information. Thus, for example, the encoded OOB information may utilize acronyms, symbolic identifiers, or the like to identify various aspects of the information encoded therein. By way of example, a server may encode the SSID (S) of its network, the security type of its network (T), the network password (P), its internet protocol address on the network (A), its port number (N), a passcode (PIN), and its identifying indicia (ID) into a mutually supported OOB medium in the following exemplary message format:

WIFI:S[SSID];T:[security type]; P:[network password]; A:[IP address];N:[port number];PIN:[passcode];ID:[identifying indicia]. Of course, this format is exemplary only, and other message formats may be used. In some embodiments, reducing the size of the message format can improve the accuracy with which the encoded OOB information may be read and decoded by a client.

Before or after the pairing information is encoded into a mutually supported OOB transfer medium, the server may enable an OOB transfer mechanism that is compatible with the selected mutually supported OOB transfer medium. For example, where NFC is selected as the mutually supported OOB transfer medium, the server may power up or otherwise enable an NFC controller within its device platform. The server may then cause the NFC controller to begin broadcasting the OOB transfer medium containing the encoded pairing information using NFC. Alternatively, where a barcode is selected as the mutually supported OOB transfer medium, the server may enable an appropriate display on its device platform and cause the barcode containing the encoded pairing information to be presented on such display.

Before or after the server encodes pairing information into a mutually supported OOB transfer medium, a client side OOB receiving mechanism compatible with the selected mutually supported OOB transfer medium may be initiated (block 308). For example the server may, upon selecting a mutually supported OOB transfer medium, notify the client of its selection. Upon receiving such notification, the client may automatically initiate a client side OOB receiving mechanism compatible with the selected mutually supported OOB transfer medium. Alternatively, the client may prompt a client user to initiate the appropriate OOB receiving mechanism.

For example, where NFC is selected as the mutually supported OOB transfer medium, the client may power up or otherwise enable an NFC controller within its device platform. Alternatively, where a barcode is selected as the mutually supported OOB transfer medium, the client may enable an appropriate barcode reading mechanism on its device platform. For example, the client may initiate a camera based barcode reader to read and decode a barcode presented on the display of a server. Alternatively or additionally, the client may enable a non-camera based barcode reader, such as but not limited to a charged capture display (CCD) reader, an omnidirectional barcode scanner, a laser barcode scanner, and the like.

In instances where audio is selected as the mutually supported OOB transfer medium, the client may enable an appropriate audio receiving device on its device platform. For example, the client may enable on or more microphones on its device platform.

Once an appropriate OOB receiving mechanism is enabled on the client, the method may proceed to blocks 309 and 310, wherein the OOB receiving mechanism is used by the client to obtain and decode the encoded pairing information from the OOB transfer medium generated by the server. For example, in instances where NFC is selected as a mutually supported OOB transfer medium, the client can cause an NFC controller on its device platform to listen for NFC broadcasts from the server, and obtain the encoded pairing information from the server in that manner. In such instances, the client and server devices may be brought into proximity to one another (e.g. tapped together), so as to facilitate communication of the OOB transfer medium via NFC.

Alternatively, where a barcode is selected as a mutually supported OOB transfer medium, the client may enable an appropriate barcode reading mechanism (discussed above) to read a barcode containing the encoded pairing information from a display on the server. For example, the client (or client user) may cause a camera within the client's device platform to capture an image of a barcode presented on a display of the server. Software executed by the client may then be used to decode the barcode in the captured image, thus obtaining the encoded pairing information.

In instances where audio is selected as a mutually supported OOB transfer medium, the client may enable an appropriate audio recording mechanism (discussed above), and use such mechanism to record audio play through a speaker of the server. Software executed by the client may then be used to decode the audio recorded from the server, thus obtaining the pairing information encoded in the audio signal.

Once the client has received the pairing information OOB from the server, the process may proceed to block 204, which is described in detail below in connection with FIG. 3C.

Figure 3C:
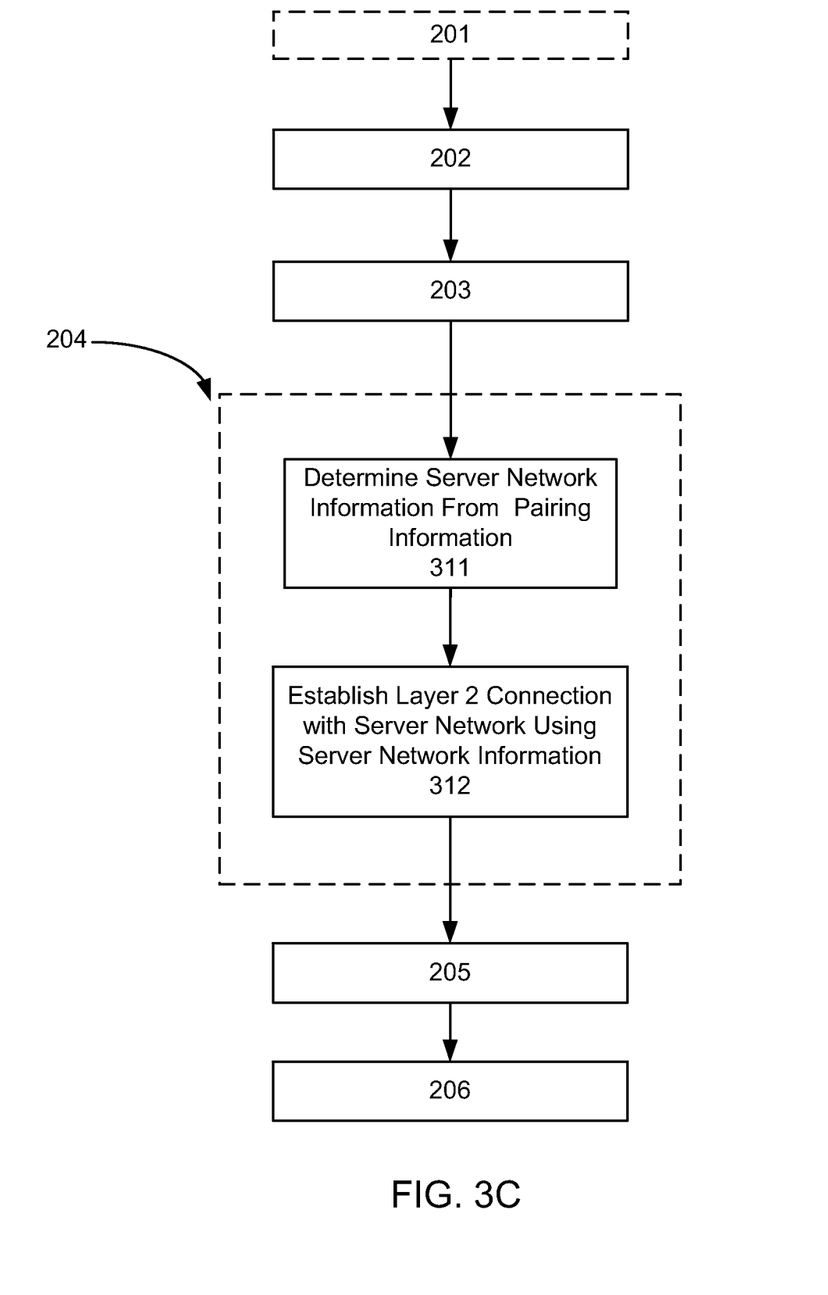
FIG. 3C is a flow diagram of a non-limiting method of establishing a secure layer 2 connection, in accordance with non-limiting embodiments of the present disclosure.

FIG. 3C is a flow diagram of a non-limiting method of establishing a secure layer 2 connection between a client and a server using server network information conveyed to the client out of band, in accordance with non-limiting embodiments of the present disclosure. As shown, FIG. 3C provides further details with respect to operations that may be performed in block 204 of FIG. 2.

Once pairing information is received by the client OOB from the server as discussed in connection with block 203 above, the method may proceed to block 311. At that time, the client may analyze the pairing information received for server network information, such as but not limited to the SSID, security type, network password, and so forth associated with a network the server is on and/or which the server has created. The client may then use such server network information to establish (block 312) a secure layer 2 connection with the server itself (e.g., in instances where the server has created an ad-hoc or direct WIFI network, as discussed above), or with an access point to which the server has already established a secure layer 2 connection.

As may be appreciated, if the server is on or has created a secure network, transmission of the network password may be required for the client to establish a secure layer 2 connection as described above. In non-limiting preferred embodiments, transmission of the network password encoded in the OOB information is automatically performed by the client, without user input. Of course, automatic transmission of the network password is not required, and the present disclosure envisions embodiments wherein the client prompts a client user before the network password is transmitted, and/or prompts a client user to enter the network password prior to its transmission. In the latter case, the network password encoded in the OOB transfer medium may be decoded by software on the client, which may then populate a field in a graphical user interface with the password. The client may then prompt the client user to permit transmission of the network password or, alternatively, provide another field for the manual entry of the network password by the client.

Figure 3D:
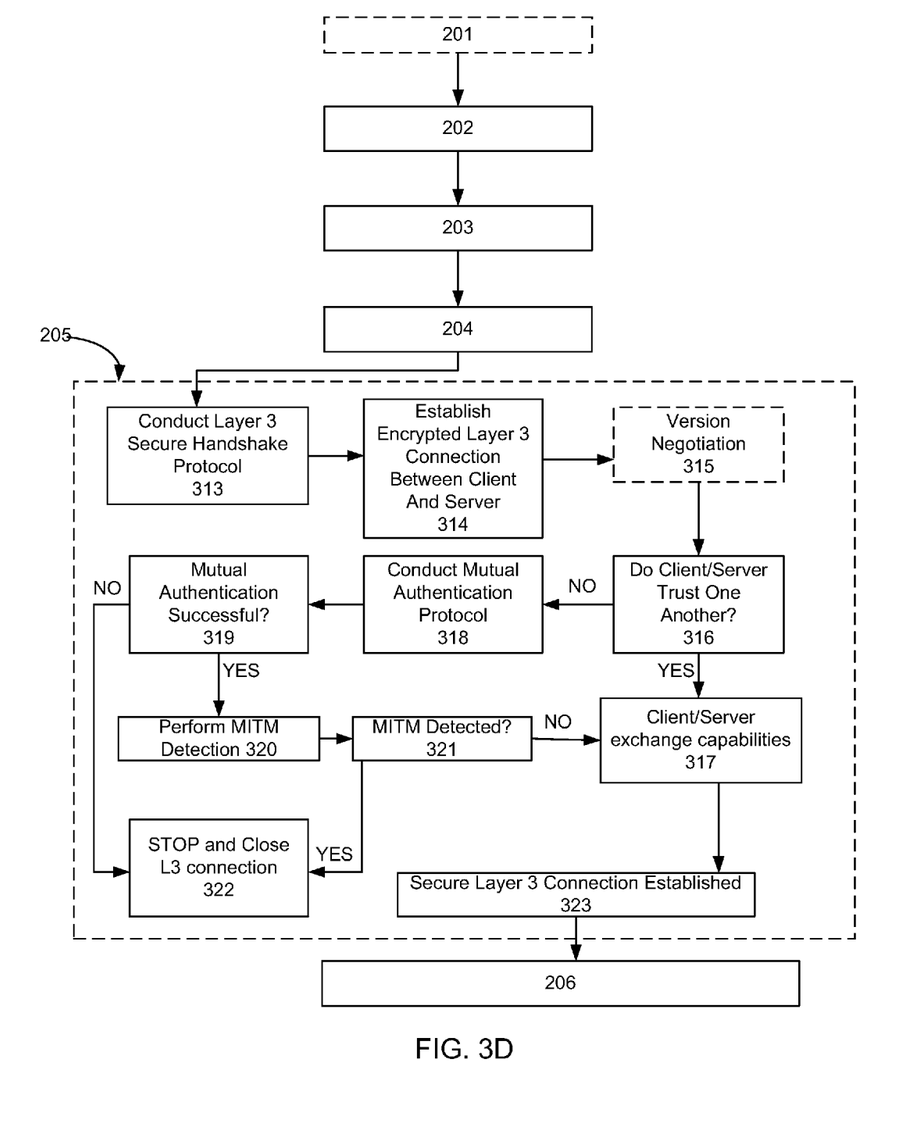
FIG. 3D is a flow diagram of a non-limiting method of establishing a secure layer 3 connection, in accordance with non-limiting embodiments of the present disclosure.

Once a secure layer 2 connection has been established (per block 204) above, the method may proceed to block 205, which is discussed in further detail with reference to FIG. 3D. FIG. 3D is a flow diagram of a non-limiting method of establishing a secure layer 3 connection, in accordance with non-limiting embodiments of the present disclosure.

As shown in FIG. 3D, once a secure layer 2 connection has been established, the process may proceed to block 313, in which a layer 3 secure handshake protocol may be executed between the client and the server. As a non-limiting example of a layer 3 secure handshake protocol that may be used in accordance with the present disclosure, mention is made of the mutual transport layer security protocol ("mTLS"). As may be understood, mTLS can allow a client and server to authenticate one another and then negotiate an encryption algorithm and cryptographic keys before an application protocol transmits or receives data. In typical mTLS, a client and server exchange certificates that are issued to the client and server from a mutually trusted certification authority (CA). The certificates prove the identity of the client to the server, and vice versa. The mTLS handshake may also be performed using client and server certificates that are not issued by a CA. In such instances, use of a CA is not required. Because the certificates used in such instances to identify the client and server are not issued by a trusted CA however, further verification of the identity of the client and server may be required.

In some embodiments of the present disclosure, the secure layer 3 handshake protocol (e.g., mTLS) may be conducted using traditional mTLS, i.e., using certificates that were issued to the client and server, respectively, by a trusted CA. In other non-limiting embodiments, the secure layer 3 handshake protocol (e.g., mTLS) is conducted using client and server certificates that may be generated as identifying indicia at the time a UPP is provisioned and/or first executed on the client and server.

If the layer 3 secure handshake protocol successfully completes, an encrypted layer 3 connection may be established between the client and the server (block 314) and the process may be allowed to continue. At optional block 315, the server and the client can exchange information through the encrypted layer 3 connection regarding the version of the UPP that each of them are executing. The client and server may then negotiate a mutually supported version of the UPP that can be used in further operations of the process. Once a mutually supported version of the UPP is determined, the process may proceed to block 316 wherein the client makes a determination as to whether it trusts the server, and the server makes a determination as to whether it trusts the client.

With this in mind, the UPP protocol when executed may cause a client/server to store a record of all the clients/servers to which it has previously connected using its UPP. For example, a client/server may store a copy of the identifying indicia of each client/server to which it has previously connected. Once the encrypted layer 3 connection is established (per block 314), the client may compare the identifying indicia it received from the server to all of the identifying indicia it has previously received and which are stored in its records. Likewise, the server may compare the identifying indicia it has received from the client to all of the identifying indicia it has previously received and which are stored in its records. If the identifying indicia received from the server in the present connection matches identifying indicia stored in the client's records, then the client may determine that it trusts the server. Likewise if the identifying indicia received from the client in the present connection matches identifying indicia stored in the server's records, then the server may determine that it trusts the client.

If both the client and the server trust one another, the process may proceed to block 317, wherein the client and server exchange capabilities and a secure layer 3 connection is established at block 323. If one or both the client and the server do not trust one another, the process may proceed to block 318, wherein a mutual authentication protocol may be executed. As non-limiting examples of suitable mutual authentication protocols that may be used in accordance with the present disclosure, mention is made of zero-knowledge password proof methods, also known as password authenticated key agreement methods. Non-limiting examples of such methods include the strong remote password (SRP) protocol and the Diffie Hellman encrypted e-key exchange (DH-EKE) protocol. As may be understood, such protocols when completed result in a session key that may be shared by the devices on either side of the mutual authentication, in this case, the client and server.

In some embodiments, SRP is used as the mutual authentication protocol. In such instances, all or a portion of the OOB information transferred from the server to the client (per block 203) may be used as a seed for generating a session key that is shared by the client and the server. In some instances, for example, the unique password generated by the UPP executed on the server (per block 307 above) may be used as the seed in SRP to generate a session key. In any case, once a session key is generated by both the client and the server, the client and server can then perform operations that confirm that each of them possess the same session key. If so, mutual authentication by SRP may be considered to have succeeded.

Once a mutual authentication protocol has been conducted, the process may proceed to block 319, wherein a determination may be made as to whether mutual authentication was successful. If mutual authentication fails, the process may stop and the layer 3 connection may be closed (block 322). If mutual authentication succeeds however, a shared session key has been generated and the process may be allowed to continue.

In instances where the client and/or server do not trust each other, a concern may arise that the connection between the server and client may be compromised by a so-called "man in the middle" ("MITM") That is, a concern may arise that at some point prior to mutual authentication, a third party device (i.e., a MITM) may have intercepted communications from the client (or server) that include the client's (or server's) identifying indicia, and repeated such messages to the server (or client). In response, the server (or client) may send future communications to the MITM, which may then repeat such messages to the client (or server). As a result, the MITM may be able to gain access to resources on the server (or client) and/or "snoop" communications intended for transmission between the client and server.

To account for this possibility, the systems and methods of the present disclosure may conduct a MITM detection protocol after the mutual authentication protocol performed pursuant to block 318 successfully completes. Accordingly, in block 320 of FIG. 3D, a MITM detection process may be conducted. In a non-limiting example of such a process, mention is made of a process in which the shared session key (K) resulting from mutual authentication is converted by both the client and the server to another key (K') using a hash-based message authentication code (HMAC). For example, the session key (K) may be converted to K' using a secure hashing algorithm (SHA), such as but not limited to SHA128, SHA160, SHA192 and/or SHA256. As a non-limiting example of such hashing, shared session key K may be converted to another key K' using the following function: K'=HMAC(k,1), wherein H is SHA256 or another hashing algorithm. Of course, this conversion method is exemplary only and other methods of converting K to K' may be used Once K is converted to K', the message authentication code may bind K' to all or a portion of the client and server's identifying indicia (e.g., the client and server certificates used to establish the encrypted layer 3 connection). The client and server may then each hash K' with the client identification indicia and server identification indicia. By way of example, the client and server may both perform the following HMAC functions: HMAC(K', H(client ID)||H (server ID)); and HMAC(K', H(server ID)||H(client ID)), wherein "client ID" and "server ID" are the identification indicia (e.g., certificates) of the client and the server, respectively, and H is SHA256 or another hashing algorithm. Each endpoint (client/server) in the connection may then send one of the calculated HMACs to the other endpoint, and compare the HMAC it retains to the HMAC it receives. If the retained HMAC does not match the received HMAC, a MITM attack may be likely. If the received HMAC is identical to the retained HMAC, however, the client and server may be assured that they are communicating without interference from a MITM. Of note is the fact that in this non-limiting example, the order of concatenation in the HMAC functions is reversed, which can prevent replay of a packet containing one of the HMAC's to its source.

Once MITM detection is performed, the process may proceed to block 321, wherein a determination may be made as to whether a MITM is detected. If a MITM is detected (e.g., by a mismatch in the retained HMAC and the received HMAC at the client and/or server), then the process may be terminated and the layer 3 connection may be closed (block 322). If a MITM is not detected however, the client and server may exchange capabilities (block 317) and a secure layer 3 connection is established (block 323). The process may then proceed to block 206.

At this point, an application pairing process may be executed to pair one or more applications on the client with one or more applications on the server. Such a pairing process may include, for example, transmitting a PIN or other passcode from the client to the server so as to establish a data sharing session with one or more applications on the server.

Like the layer 2 and layer 3 connections, information that may be needed to conduct an application pairing process may be encoded in the OOB information transmitted from the server to the client. For example, the server may encode a PIN or other passcode needed to establish a data sharing session with a server side application into a selected mutually supported OOB transfer medium. In such instances, a client may decipher such PIN/passcode from the OOB transfer medium encoded by the server, and communicate such PIN/passcode to an appropriate application executed on the server once the secure layer 2 and layer 3 connections are established.

In some embodiments, pairing of the client and server applications occurs automatically once the secure layer 2 and layer 3 connections are established. Alternatively, the client may prompt a client user (e.g., through a GUI) to initiate software pairing and/or complete one or more operations associated with a software pairing process. In any event, it may be understood that one or more data sharing operations may be performed after the secure layer 2 and layer 3 connections are established.

In further non-limiting embodiments, application pairing may occur as a part of establishing the secure layer 3 connection, as discussed above. In such instances, the client may receive information necessary to establish a data sharing session with an application on the server from a mutually supported OOB transfer medium encoded in the server. The client may then exchange such information with the server during the establishment of a secure layer 3 connection. In such embodiments, application pairing would result once the operations described in connection with block 323 are complete. Thus, execution of another application pairing protocol subsequent to the establishment of the secure communications channel may not be required.

Other embodiments of the present disclosure will be apparent to those skilled in the art from consideration of the specification and practice of the inventions disclosed herein. It is intended that the specification be considered as exemplary only, with a true scope and spirit of the invention being indicated by the following claims.

What is claimed is:

1. An apparatus comprising a processor and a memory, said memory having unified pairing protocol (UPP) instructions stored thereon, wherein said UPP instructions when executed by said processor cause said processor to perform the following operations comprising:

encoding out of band information to provide resulting encoded information, into at least one out of band transfer medium using an encoding format that controls a size of the resulting encoded information, said resulting encoded information including at least server network information and server datalink information wherein said server network information comprises a service set identifier, a network security type, a network password, and combinations thereof; and wherein said server datalink information comprises an Internet Protocol (IP) address, a host name, a service identification, an operating system (OS) identifier (ID), a port number, and combinations thereof;

transferring said resulting encoded information using at least one out of band transfer medium;

establishing a secure layer 2 connection between said apparatus and at least one second device using at least said server network information contained in said resulting encoded information; and establishing a secure layer 3 connection between said apparatus and said at least one second device using at least said server datalink information contained in said resulting encoded information, conducting at least one mutual authentication protocol between said apparatus and said at least one second device and conducting at least one man in the middle detection process between said apparatus and said at least one second device.

2. The apparatus of claim 1, wherein said at least one out of band transfer medium comprises at least one of a near field communication signal, a barcode, an audio signal, and combinations thereof, said apparatus further comprising at least one out of band transfer mechanism compatible with one or more of said at least one out of band transfer medium.

3. The apparatus of claim 1, wherein said UPP instructions are provisioned in said memory prior to establishing said secure layer 2 connection; and said UPP instructions when executed by said processor cause said processor to generate unique identifying indicia for said apparatus.

4. The apparatus of claim 1, wherein said memory further comprises at least one first application stored thereon, and said UPP instructions when executed by said processor cause said processor to conduct an application pairing process with said at least one second device so as to pair said at least one application with at least one second application executed on said at least one second device.

5. The apparatus of claim 1, wherein said UPP instructions when executed further cause said processor to negotiate at least one mutually supported out of band transfer medium with said at least one second device, said at least one mutually supported out of band transfer medium being supported by said apparatus and said at least one second device.

6. The apparatus of claim 1, wherein establishing said secure layer 3 connection comprises conducting at least one secure layer 3 handshake protocol between said apparatus and said at least one second device.

7. The apparatus of claim 1, wherein said encoding format utilizes at least symbolic identifiers.

8. The apparatus of claim 1 wherein said OS ID connotes an independent application, a part of an application that facilitates communication among multiple devices by leveraging the UPP and a graphical user interface (GUI).

9. A method comprising:

encoding out of band information to provide resulting encoded information, into at least one out of band transfer medium using an encoding format that controls a size of the resulting encoded information, said resulting encoded information including at least server network information and server datalink information wherein said server network information comprises a service set identifier, a network security type, a network password, and combinations thereof; and wherein said server datalink information comprises an Internet Protocol (IP) address, a host name, a service identification, an operating system (OS) identifier (ID), a port number, and combinations thereof;

transferring said resulting encoded information between at least one client and at least one server using at least one out of band transfer medium;

establishing a secure layer 2 connection between said at least one client and said at least one server using said server network information contained in said resulting encoded information; and establishing a secure layer 3 connection between said at least one client and said at least one server using said server datalink information contained in said resulting encoded information, conducting at least one mutual authentication protocol between an apparatus and at least one second device and conducting at least one man in the middle detection process between said apparatus and said at least one second device.

10. The method of claim 9, wherein said at least one out of band transfer medium comprises at least one of a near field communication signal, a barcode, an audio signal, and combinations thereof.

11. The method of claim 9, wherein said encoding said out of band information into said at least one out of band transfer medium is performed by said at least one server.

12. The method of claim 9, wherein:
prior to establishing said secure layer 2 connection, said at least one server is connected to at least one network; and
said server network information including information that is sufficient to enable said at least one client to connect to said at least one network.

13. The method of claim 9, wherein client side and server side unified pairing protocols are provisioned on said at least one client and said at least one server, respectively, prior to establishing said secure layer 2 connection.

14. The method of claim 13, further comprising:
generating unique client identifying indicia with client side unified pairing protocol; and
generating unique server identifying indicia with said client side unified pairing protocol.

15. The method of claim 9, wherein said at least one client comprises at least one client side application and said at least one server comprises at least one server side application, the method further comprising conducting an application pairing process to pair said at least one client side application with said at least one server side application.

16. The method of claim 9, further comprising:
negotiating at least one mutually supported out of band transfer medium, said at least one mutually supported out of band transfer medium being supported by said at least one client and said at least one server; and
selecting at least one mutually supported out of band transfer medium with said at least one server.

17. The method of claim 16, further comprising, enabling at least one server side and at least one client side out of band transfer mechanism corresponding to a mutually supported out of band transfer medium selected by said at least one server.

18. The method of claim 9, wherein establishing said secure layer 3 connection comprises conducting at least one secure layer 3 handshake protocol between said at least one client and said at least one server.

19. The method of claim 9 wherein said OS ID connotes an independent application, a part of an application that facilitates communication among multiple devices by leveraging the UPP and a graphical user interface (GUI).

20. At least one non-transitory computer readable medium having unified pairing protocol instructions stored thereon, which when executed by a processor cause the processor to perform the following operations comprising:
receiving out of band information from at least one server using at least one out of band transfer medium, said out of band information including at least server network information and server datalink information encoded using an encoding format that controls a size of the out of band information, wherein said server network information comprises a service set identifier, a network security type, a network password, and combinations thereof; and wherein said server datalink information comprises an Internet Protocol (IP) address, a host name, a service identification, an operating system (OS) identifier (ID), a port number, and combinations thereof;
establishing a secure layer 2 connection with said at least one server using said server network information; and
establishing a secure layer 3 connection with said at least one server using said server datalink information contained in said encoded out of band information, conducting at least one mutual authentication protocol between an apparatus and at least one second device and conducting at least one man in the middle detection process between said apparatus and said at least one second device.

21. The at least one computer readable medium of claim 20, wherein said unified pairing protocol instructions when executed further cause said processor to perform the following operations comprising:
decoding said out of band information from said at least one out of band transfer medium.

22. The at least one computer readable medium of claim 20, wherein:
prior to establishing said secure layer 2 connection, said at least one server is connected to at least one network; and
said server network information including information that is sufficient to cause said at least one processor to connect to said at least one network, said server network information comprises at least one of a service set identifier, a network security type, a network password, and combinations thereof.

23. The at least one computer readable medium of claim 20, wherein said unified pairing protocol instructions when executed further cause said processor to perform the following operations comprising:
generating unique identifying indicia associated with a device of which the processor is a part; and
storing said unique identifying indicia in a memory of said device.

24. The at least one computer readable medium of claim 20, wherein said unified pairing protocol instructions when executed further cause said processor to perform the following operations comprising:
executing at least one client side application stored in a memory of a client device; and
conducting an application pairing process to pair said at least one client side application with at least one server side application executed on said at least one server.

25. The at least one computer readable medium of claim 20, wherein said unified pairing protocol instructions when executed further cause said processor to perform the following operations comprising:
negotiating at least one mutually supported out of band transfer medium with said at least one server, said at least one mutually supported out of band transfer medium being supported by at least one client and said at least one server;
enabling at least one client side out of band transfer mechanism corresponding to a mutually supported out of band transfer medium selected by said at least one server; and
receiving said out of band information from said at least one server using said at least one client side out of band transfer mechanism.

26. The at least one computer readable medium of claim 20, wherein establishing said secure layer 3 connection comprises conducting at least one secure layer 3 handshake protocol between at least one client and said at least one server, wherein establishing said secure layer 3 connection comprises conducting at least one mutual authentication protocol between said at least one client and said at least one server.

27. The at least one computer readable medium of claim 20 wherein said OS II) connotes an independent application, a part of an application that facilitates communication among multiple devices by leveraging the UPP and a graphical user interface (GUI).

* * * * *